United States Patent [19]
Farris et al.

[11] Patent Number: 5,102,601
[45] Date of Patent: Apr. 7, 1992

[54] PROCESS FOR FABRICATING NOVEL COMPOSTES BASED ON REINFORCEMENT WITH MICROFIBRILLAR NETWORKS OF RIGID-ROD POLYMERS

[76] Inventors: Richard J. Farris, 428 Chesterfield Rd., Northampton (Leeds), Mass. 01053; Yachin Cohen, 3 Manila Street, Haifa, Israel; Steven J. DeTeresa, 874 Adams Ave., Livermore, Calif. 94550

[21] Appl. No.: 286,243

[22] Filed: Dec. 19, 1988

Related U.S. Application Data

[62] Division of Ser. No. 899,910, Aug. 25, 1986, Pat. No. 4,842,924.

[51] Int. Cl.⁵ .......................... D01D 5/12; B32B 27/02
[52] U.S. Cl. ...................... 264/183; 264/108; 264/184; 264/204; 264/205; 264/210.8; 264/232; 264/171; 264/211.15; 264/211.16; 264/211.18; 264/211.19; 264/340
[58] Field of Search ................... 264/183, 9, 216, 128, 264/211.16, 211.19, 184, 108, 204, 205, 210.8, 232, 171, 211.15, 211.18, 340

[56] References Cited

U.S. PATENT DOCUMENTS

| | | | |
|---|---|---|---|
| 3,016,599 | 1/1962 | Perry, Jr. ................................ | 28/78 |
| 3,068,527 | 12/1962 | Morgan ................................ | 264/183 |
| 3,546,063 | 12/1970 | Breen ................................ | 161/176 |
| 3,743,272 | 7/1973 | Nowotny et al. ....................... | 264/9 |
| 4,108,835 | 8/1978 | Arnold et al. ......................... | 528/183 |
| 4,127,624 | 11/1978 | Keller et al. ........................... | 264/23 |
| 4,141,942 | 2/1979 | Maehara ................................ | 264/9 |
| 4,181,794 | 1/1980 | Kim et al. .............................. | 264/9 |
| 4,198,461 | 4/1980 | Keller et al. ........................... | 428/288 |
| 4,207,407 | 6/1980 | Helminiak et al. ................... | 525/425 |
| 4,234,652 | 11/1980 | Vanoni et al. ........................ | 428/296 |
| 4,309,531 | 1/1982 | Kyritsos et al. ...................... | 528/339 |
| 4,324,831 | 4/1982 | Parrini et al. ........................ | 428/288 |
| 4,377,546 | 3/1983 | Helminiak et al. .................. | 264/232 |
| 4,468,428 | 8/1984 | Early et al. .......................... | 428/221 |
| 4,472,541 | 9/1984 | Sorensen et al. ..................... | 523/220 |
| 4,487,735 | 12/1984 | Chenevey et al. ................... | 264/184 |
| 4,504,532 | 3/1985 | Herring ................................ | 428/36 |
| 4,554,119 | 11/1985 | Chenevey ............................ | 264/184 |
| 4,606,875 | 8/1986 | Chenevey et al. ................... | 264/184 |

*Primary Examiner*—Hubert C. Lorin
*Attorney, Agent, or Firm*—Rines and Rines

[57] ABSTRACT

A process for fabricating a composite in the form of a network of microfibrils which includes interpenetrating the microfibrils with a matrix material to form a composite which includes two continuous interpenetrating phases, a matrix-material phase and a microfibrillar-reinforcing-network phase.

19 Claims, 4 Drawing Sheets

FIG. 1A WET, COAGULATED FIBER
FIG. 1C DRIED (AS-SPUN) FIBER
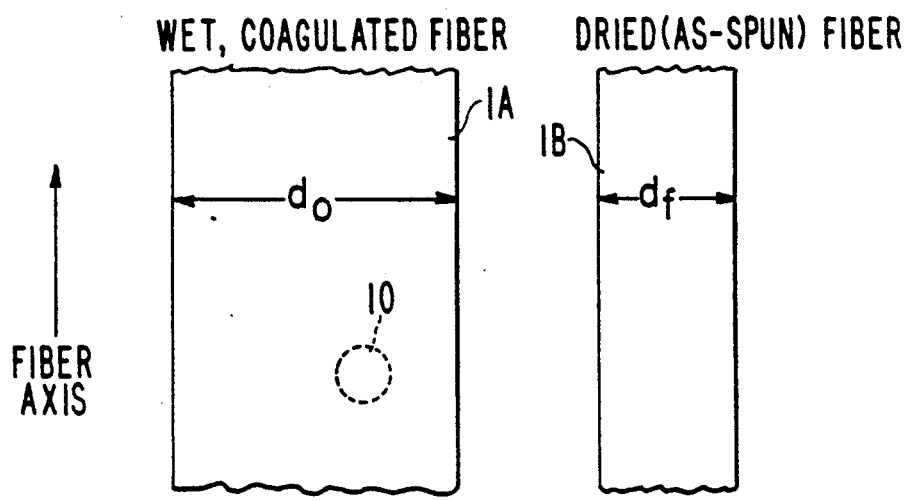
FIG. 1B
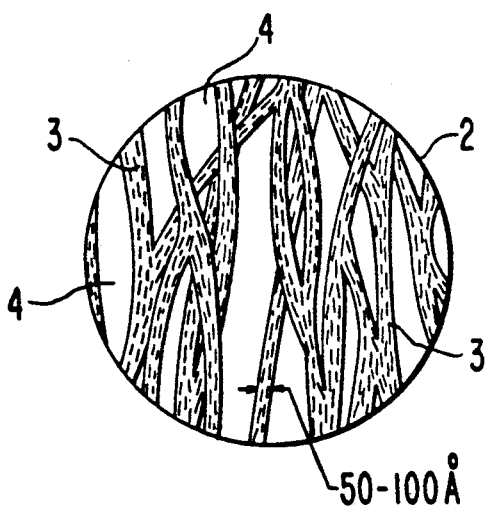
FIG. 3
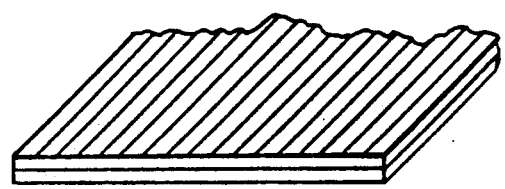

PROCESS FOR FABRICATING NOVEL COMPOSTES BASED ON REINFORCEMENT WITH MICROFIBRILLAR NETWORKS OF RIGID-ROD POLYMERS

This is a division of Ser. No. 899,910 filed Aug. 25, 1986, now U.S. Pat. No. 4,842,924.

The present invention relates to processes for fabricating composites and to composites formed in accordance with the processes.

Prior art, fiber-reinforced composites are fabricated by impregnation of a yarn of fibers, which are typically on the order of ten micrometers in diameter, with a liquid matrix that is subsequently solidified to form a solid composite. The fiber-reinforced composite so formed is essentially a two-phase material composed of a continuous matrix (e.g., epoxy) that binds the more rigid-fiber phase (e.g., glass or carbon). The reinforcing-fiber phase may be either continuous or discontinuous.

An object of the present invention is to provide a new composite material in which the reinforcing phase is an interconnected network of microfibrils of a rigid-chain polymer. As used, the term rigid polymer denotes a polymer which has the ability to form a liquid crystalline phase, either in a solution or melt. The width of these microfibrils is on the order of 100 Å. Thus, the reinforcing phase in the composite material of the present invention differs from that of prior composites by being an interconnected network and by having a typical width three orders of magnitude smaller.

Another object is to utilize the rigid, oriented microfibrillar network for formation of composite fibers and films of enhanced strength characteristics in shear, compression and tension, by judicial combination of microfibril-forming material and matrix material.

A further object is to use the microfibrillar-network composite fibers or films to produce bulk structures of enhanced properties by bonding together the composite fibers or films; the microporous nature of the microfibrillar-network-reinforcing phase allows the precursor of the matrix material, imbibing the microfibrillar network, to be used for bonding between adjacent fibers or films.

Further objects are addressed hereinafter.

The foregoing objects are achieved, generally, in a process for fabricating a composite that includes forming a network of microfibrils of a rigid polymer; and interpenetrating the microfibrils with a matrix material to form a composite that includes two continuous and interpenetrating phases, a matrix-material phase and a microfibrillar-network-reinforcing phase. The objects are achieved also in a film formed in accordance with the foregoing process, a mat formed by weaving or otherwise combining many composites, and a multilayer composite that includes a plurality of the composites, films or mats stacked in layers, one on the other and then solidified so that the matrix material bonds together the films to form a multilayered composite structure.

The invention is hereinafter described with reference to the accompanying drawing in which:

FIG. 1A is greatly enlarged a longitudinal view of a diagrammatic representation of a fiber in the form of an oriented network or mesh of microfibrils with a coagulant (e.g., water) within the network of microfibrils;

FIG. 1B shows a greatly enlarged view of the region designated 10 in FIG. 1A;

FIG. 1C shows the fiber of FIG. 1A after drying to remove the coagulant within the mesh;

FIG. 3 is an isometric view of a multilayered composite formed of fibers, like the fiber in FIG. 2, into a film and then formed in multilayers of the film;

Figure 2:
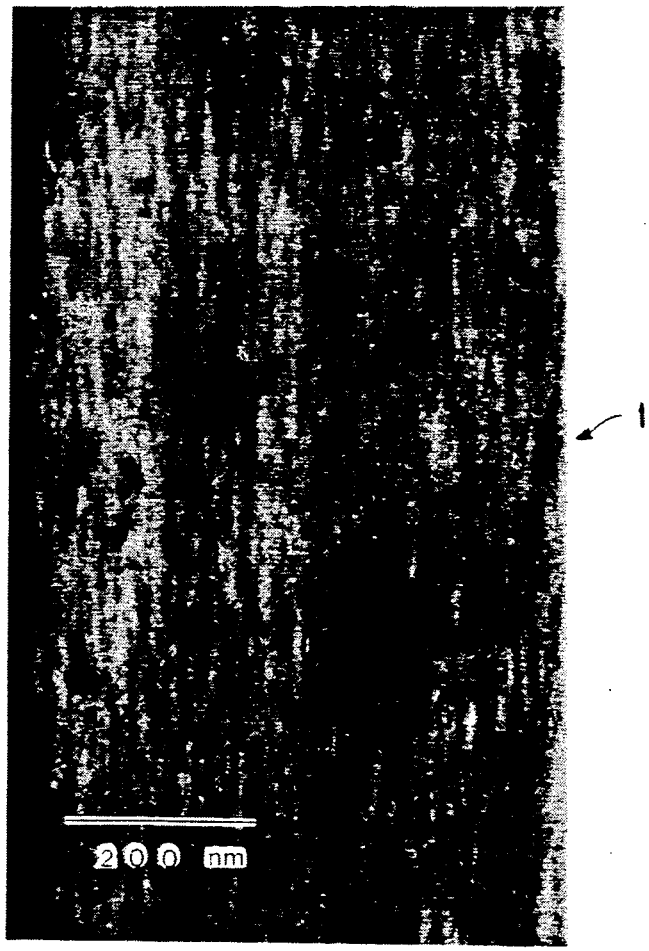
FIG. 2 is an electron micrograph of a longitudinal view of a fiber like the fiber in FIG. 1A except with the coagulant within the mesh replaced by a matrix material in accordance with the present teaching.

The fiber labeled 1 in FIG. 2 is a composite fabricated in accordance with the present teachings. It includes a network of interconnected microfibrils (see the network labeled 2 in FIG. 1B) in which the microfibrils labeled 3 in FIG. 1B are oriented generally along the long axis of the fiber and constitute one continuous microfibrillar-network-reinforcing phase of the composite 1 in FIG. 2. The other phase of the composite, as explained in some detail later herein, is a matrix material which, in the composite fiber, is a material that serves to transmit shear forces, compression forces and tension forces between the microfibrils 3. In the final product, the matrix material fills the gaps (i.e., the spaces between the microfibrils 3) labeled 4 in FIG. 1B, but, as later noted, at the state of the network in FIGS. 1A and 1B the gaps 4 are filled with a coagulant (e.g., water). The dark parts in FIG. 2 (which is an electron micrograph) are the microfibrils 3 and the light parts consist of the matrix material. For example, the microfibrillar network 2 can be formed in apparatus like the system in FIG. 4 during the dry-jet-wet spinning of solutions of poly (p-phenylene benzobisthiazole) which is called PBT. The coagulation (i.e., phase separation) of lyotropic liquid crystalline polymers from solution under certain conditions yields 50–100 Å diameter microfibrils of the rigid-chain polymer which forms a three-dimensional network of the microfibrils with surprisingly high mechanical integrity. The present invention utilizes the microfibrillar network formed by rigid-chain polymers in a composite that effectively utilizes the strength and stiffness of the microfibrils and enhances those characteristics.

The phase separation of rigid-chain polymers from solution into microfibrils is discussed, for example, in: W. G. Miller et al., in J. Polym. Sci., Polym. Symp., 65, 91 (1978); K. Tohyama et al., Nature, 289, 813 (1981), and elsewhere.

Figure 4:
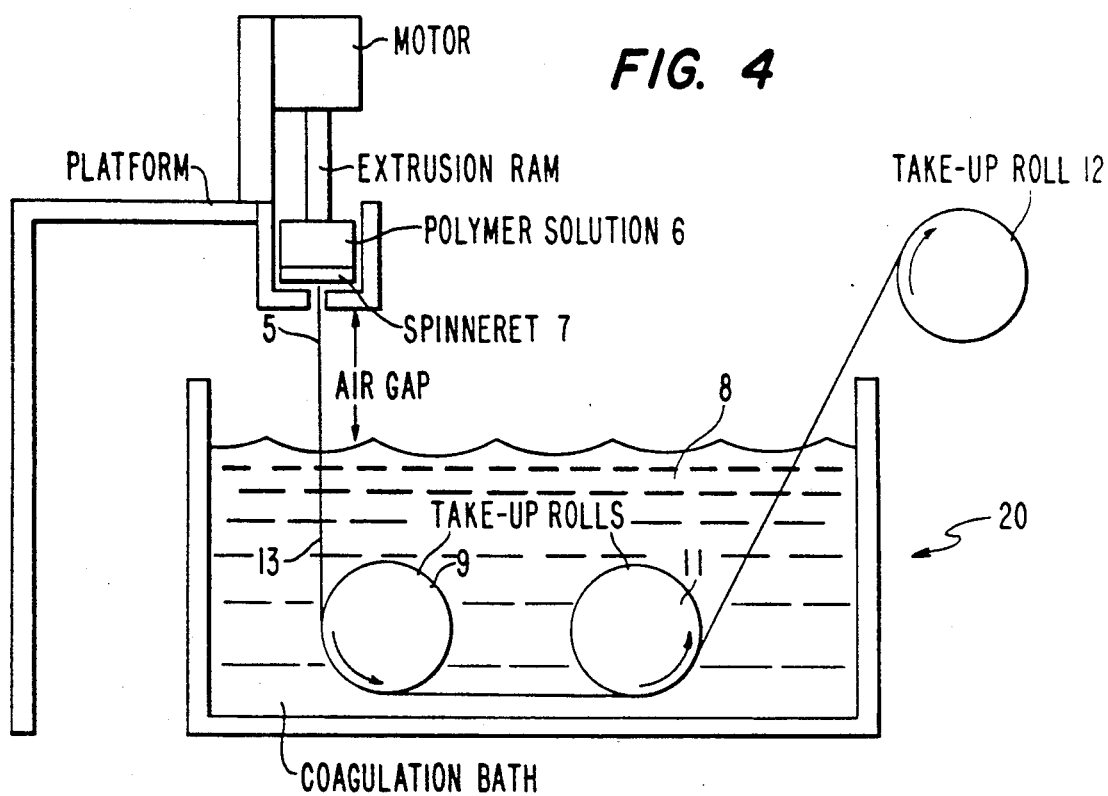
FIG. 4 is a schematic of dry-jet/wet-spinning apparatus operable to form the oriented network of microfibrils shown in FIG. 1A.

One system for producing a network of microfibrils is the dry-jet/wet-spinning system labeled 20 in FIG. 4 for PBT or other materials. The polymer chain axis in the fiber or film thus formed is oriented parallel to the long axis of the microfibrils, as shown in FIG. 1B.

Figure 5:
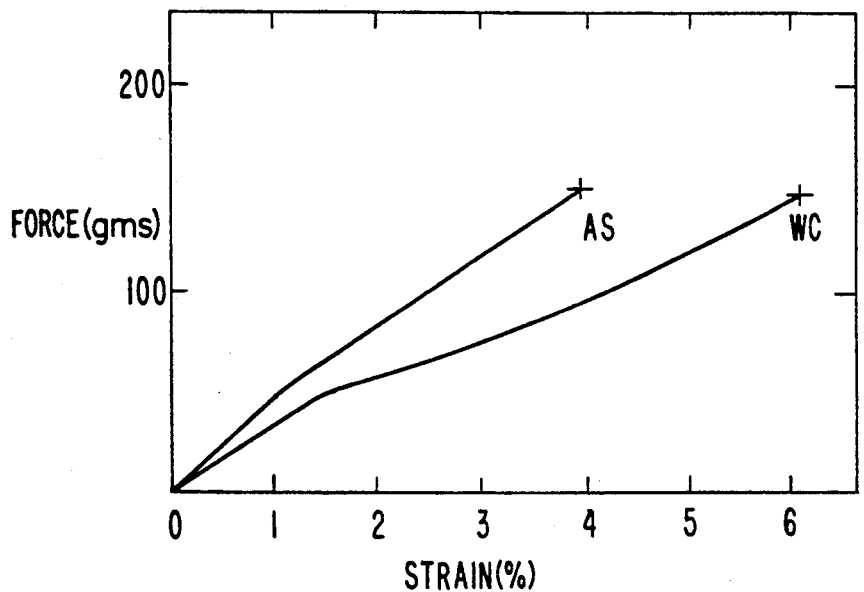
FIG. 5 shows the tensile force-strain behavior of coagulated fibers of the type shown in FIG. 1A (curve WC) and the type in FIG. 1C (curve AS)
Figure 6:
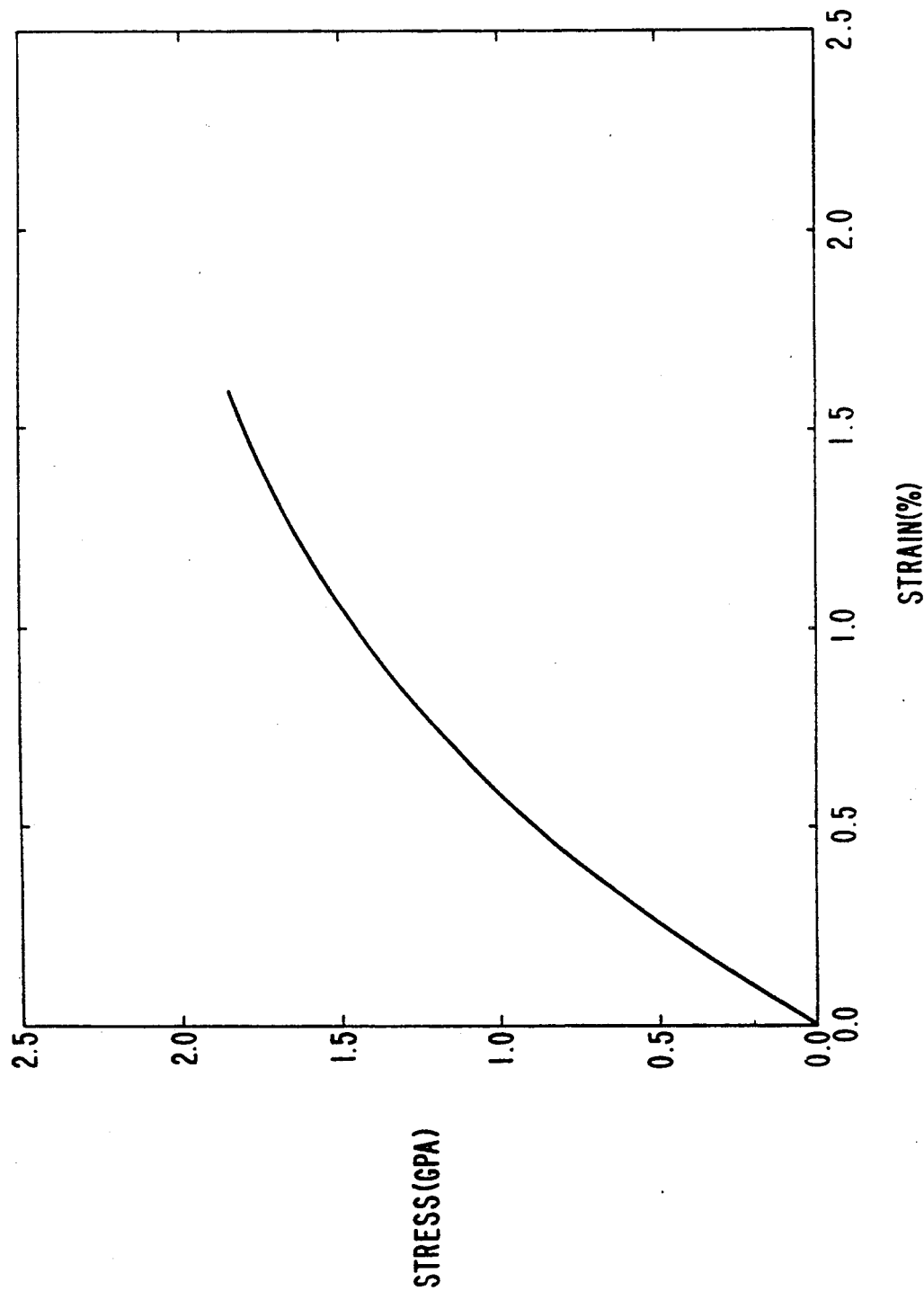
FIG. 6 is a stress-strain curve for a composite-fiber as shown in FIG. 2.

The polymer from which the network is formed is first in the form of a polymer solution, as above indicated, within an extrusion chamber 6 from which it is emitted through a spinnerette 7 as a highly viscous ribbon (or film) or fiber 5 which is formed between the spinnerette and a coagulation (e.g., water) bath 8. Essentially what occurs in the system 20 is that the viscous polymer solution at 5 is stretched before it enters the coagulation bath 8 where it takes the form shown in FIGS. 1A and 1B. In that form the microfibrils are from 50-100 Å in diameter with a coagulant (e.g., water) between them. These water-filled microfibrillar networks exhibit significant tensile force at break as indicated by the lower curve labeled WC in FIG. 5. The upper curve, labeled AS, is that of the dried material, and the relative strengths are not significantly different from one another. (It should be noted at this juncture that the resulting product can be a fiber typically about ten micrometers in diameter or it can be a film about ten micrometers thick but much wider, depending upon the geometry of the die through which the viscous ribbon or fiber 5 is emitted).

The swollen fiber/film in the bath 8 passes around take-up rolls 9 and 11 and is wound around a roll 12, but can pass around the roll 12 to a further wrapping roll (not shown). According to the present teaching, the fiber/film within the bath (which is numbered 13 for present purposes) is that which is used; that is, the microfibrillar mesh is not dried (as shown in FIG. 1C) but is, rather, treated while in the wet state, as depicted by the diagrammatic representation of FIG. 1B.

The object of this stage of the process is to introduce the matrix-forming material into the microfibrillar network formed as described before. This can be achieved by collecting the microfibrillar mesh 13 on the roll 11 which can take up the fiber or film for further treatment. Irrespective of how the mesh 13 is collected, it is subjected to a process whereby a matrix-forming material is introduced by a diffusion process of the matrix material or its precursor. If the matrix-forming molecules are soluble in the coagulant (e.g., water), they can be added in increasing concentration into the coagulant in which the microfibrillar mesh is immersed, or the collected mesh can be placed in solutions of increasing concentration of matrix-forming material, without allowing it to dry. Alternatively, the coagulant can be gradually replaced by solvent in which the matrix-forming material is soluble, and which is miscible with the coagulant. This solvent is then gradually exchanged by the matrix-forming material as explained above.

After the matrix-forming material is infiltrated into the microfibrillar mesh, whether in the form of fiber or film, excess coagulant or solvent (if any) is dried. If the matrix-forming material is a reactive mixture of organic material, it can be cured to form a solid matrix within the individual fiber or film, thus forming a microfibrillar-network-composite fiber or film.

Alternatively, the fibers and films impregnated with the matrix-forming material may be laid out as desired, such as depicted in FIG. 3, and subsequently solidified so that the matrix material also serves to bond the individual microfibrillar-network-composite fibers or films together.

By way of illustration, if the microfibrillar network used is made of PBT, and the coagulant is water, the microfibrillar mesh is placed in alcohol-water mixtures of increasing alcohol content, without drying, until water is totally replaced by alcohol. It is then introduced into solutions of an epoxy resin in alcohol with increasing epoxy resin content. This resin includes all the components (epoxide, hardener and catalyst) needed to form a suitable epoxy-matrix material upon curing. Then the microfibrillar network with the epoxy resin within it is suitably treated to solidify the matrix material.

As is noted above, in conventional composite fibers, the reinforcing fibers are typically about ten micrometers in diameter. In the present material, the composite fiber 1 in FIG. 2 is also about ten micrometers in diameter, but it is made up of microfibrils 3 (FIG. 1B) that are about 50 to 100 Å in diameter, and these microfibrils are interconnected to one another by microfibrillar interconnection; then they are connected, as well, by the solid-matrix material which, as before noted, transmits forces among the microfibrils 3. The adhesion between fibrils by virtue of the solidified-matrix material is about as strong as cohesion within the microfibrils. In addition to PBT, a number of polymers can be employed to produce the microfibrillar networks 3 as illustrated in the Table I below.

TABLE I

Microfibril-forming materials-rigid-chain polymers.

| | | |
|---|---|---|
| 1. | Aromatic polyamides: | |
| | E.g.: poly (p-benzamide) | (PBA) |
| | poly (p-phenyleneterephthalamide) | (PPTA) |
| 2. | Polyhdrazides and polyamide-hydrazides | |
| 3. | Aromatic-heterocyclic polymers | |
| | E.g.: poly (p-phenylene benzobisthiazole) | (PBT) |
| | poly (p-phenylene benzobisoxazole) | (PBO) |
| | poly (p-phenylene benzobisimidzaole) | (PDIAB) |
| | poly (2, 5(6) benzothiazole) | (AB-PBT) |
| | poly (2, 5(6) benzimidazole) | (AB-PBI) |
| 4. | Poly isocyanates | |
| 5. | Cellulose and its derivatives | |
| | cellulose | |
| | cellulose acetate | |
| | hydroxypropyl cellulose | |
| 6. | Polyamimo acids | |
| | poly (γ-benzyl-L-glutamate) | |
| | poly (ε-carbobenzoxy-L-Lysine) | |
| | poly (L-alanine) | |
| | and copolymers of the above | |

The coagulated PBT (or other fibers) 2 (i.e., formed of interconnected microfibrils 3) can consist of as much as 95 percent coagulant. That coagulant, as noted, can be first replaced by a compatible solution which is replaced by the matrix material; or a compatible solution such as water-soluble sodium silicate can be used when the coagulant is water. Later, excess solvent or coagulant is dried off, and the composite is treated to render the matrix material solid.

The only requirement for impregnation of coagulated fibers (or films) with a matrix material is that the matrix material or matrix precursor readily diffuse into the fibrillar network and replace the coagulant. Consequently, there are numerous organic and inorganic materials that may be selected as candidates for matrices to tailor the properties of microfibrillar-network composites. Examples of potential matrix materials include: (1) thermosetting polymers that may be extended to other systems such as urethane and other low-viscosity reactants which diffuse into microfibrillar networks and replace coagulant, the composite being formed by polymerization and cross-linking after impregnation; (2) thermoplastic polymers wherein a thermoplastic matrix if formed by monomer impregnation, followed by polymerization (for example, caprolactam may be substituted for coagulant and subsequently polymerized in situ to nylon-6) and (3) low-molecular weight materials, crystalline and amorphous organic and inorganic materials that are selected to form composites with unique compositions. Organic matrixes can be heat treated in situ to form a carbon matrix; ceramics and glasses can be introduced into the microfibrillar network from solution. For example, soluble silicates can be deposited in a microfibrillar network to form a continuous glass-matrix phase; and low-melting soluble glass formulations can be used to allow fusion of the glass matrix after deposition from solution.

As indicated above, substances that form the basis for the matrix material must be such that in solution such substances are able to diffuse into the microfibrillar network. These substances can be compatible with the coagulant so that a very concentrated solution thereof will result in the matrix-forming substance diffusing into the replacing most or all of the coagulant; or an intermediate step using a compatible solvent can be employed to remove the coagulant, the compatible solvent then being replaced by a substance which forms the matrix material.

Example of matrix-forming materials are given below.

---
Matrix Materials
---

I. Organic materials which can be polymerized to form a cross-linked network.
   A. Epoxy resins
      The infiltration mixture should include all the reaction components, i.e., epoxide, cross-linking agent and catalyst.
      The epoxide can be of the following class: aromatic, aliphatic, cycloaliphatic.
      The cross-linking agent can be either of the annhydride or amine type.

---
Examples:
---

| Epoxide | Cross-linking Agent | Catalyst | Comments |
|---|---|---|---|
| *Epon$^R$ 828(1) | Boron trifluoride-mono-ethyl-amine complex (BF$_3$MEA) | — | aromatic epoxide |
| *ERL$^R$ 4206(2) (Vinyl cyclohexene dioxide) | nonenyl succinic | dimethyl-amino-ethanol | cycloaliphatic epoxide ("Spurr Resin") |
| diglycidyl ether of polypropylene glycol DER$^R$ 732(3) | dodecenyl succinic annhydride | 2, 4, 6 tris-(dia-methyla-amino-ethanol) | aliphatic epoxide |

*These formulations have been tested.
(1)Shell Chemical Corporation.
(2)Union Carbide Corporation.
(3)Dow Chemical Corporation.

B. Phenolic resins
      E.g., a novolac with hexamethylene tetramine.
   C. Silicone resins
   D. Polyimides
      1. Polyimic-acid precursor (e.g., Skybond 703$^R$, Monsanto).
      2. Imide oligomers or bisimide monomers containing unsaturated aliphatic end groups.
   E. Polyurethanes and polyureas
II. Monomers which can polymerize to a linear polymer.
   A. Heterocyclic monomers
      E.g.: (1) ε-caprolactam (forming nylon 6)
            (2) ε-caprolactone (forming polyester)
   B. Vinyl monomers with suitable initiator
      E.g., styrene, methyl methacrylate, acrylonitrile.
III. Polymers infiltrated after coagulation, or spun together in solution with the rigid-chain polymer in a common solvent.
      polyamides (Nylon 6, Nylon 6, 6)
      polyesters
      poly ether ketone (PEEK)
      cellulose nitrate (lacquer)
IV. Inorganic materials.
   A. Silicates
      sodium silicate, potassium silicate, and water soluble formulations of the above.
      E.g.: (1) Na$_2$O: 3.3 Si$_2$ (40° Be)$^{(1)**}$
            (2) Mixtures of (1) with metal oxides (such as zinc oxide, magnesium oxide) which render the glass fusible at moderate temperature so that a homogeneous interconnected glass ---
-continued
Matrix Materials
--- matrix if formed
   B. Silicon alkoxides
      E.g., tetraethyl orthosilicate
**This formulation has been tested.
$^{(1)}$Baume scale-characteristic density scale for silicates.

The batch process referred to above can be employed, but a step-saving variation of the fabrication of microfibrillar-network composites is to spin polymer fibers into a coagulation bath containing a matrix precursor. This would eliminate the need for a diffusion controlled exchange of matrix for coagulant. Also, multiple loops of the fiber at 13 can be employed with multiple chambers of concentrated-matrix material.

A suitable matrix-forming material may also be dissolved together with a rigid, microfibril-forming polymer, in a common solvent prior to the formation of a fiber or film such as in the spinning apparatus shown in FIG. 4. For example, a solution of PBT and nylon can be formed in methane sulfonic acid at room temperature. The solution thus prepared can be extruded to form fibers or films using an apparatus such as shown in FIG. 4. Upon coagulation, such as in a water bath (8 in FIG. 4), the rigid polymer will form an interconnected microfibrillar network, interpenetrated with the matrix material if the ratio of the rigid polymer to the matrix-forming material is high enough (e.g., above 1:3 weight). The spaces between the interconnected microfibrils are filled with both matrix material and coagulant. Removal of coagulant, as by drying, retains an interconnected rigid microfibrillar network, interpenetrated with the matrix material.

Advantages that may be realized from use of microfibrillar networks as reinforcement for composite materials include, among others: (1) tremendous increase in interfacial surface area (improvements in utilization of reinforcement properties, toughness and mechanical energy absorption characteristics; furthermore, the network provides a tortuous path for crack propagation to reduce the tendency to fail catastrophically); (2) reduction of residual stresses and voids in the reinforcement phase (collapse of the coagulated fiber or film with drying is prevented by impregnation with a matrix); (3) because the microfibrillar-network composite is composed of two interpenetrating phases, transfer of external loads to each phase does not require a strong interfacial bond (therefore, microfibrillar-network composites may be designed to allow each phase to contribute to different material properties such as, for example, the polymer network can provide tensile strength while a ceramic or glassy matrix can provide compressive strength to the composite); and (4) microscopic fibers of rigid-rod polymers are composed of microfibrils which have been brought into contact after coagulation via drying and, therefore, the properties of such fibers can never equal those of the microfibrils. Unless the adhesion between microfibrils can be made as strong as the cohesion within microfibrils, the microfibrils will be the superior form of the polymer for reinforcement.

Modifications of the invention herein disclosed will occur to persons skilled in the art and all such modifications are deemed to be within the scope of the invention as defined by the appended claims.

What is claimed is:

1. A process for fabricating a composite, that comprises forming a network of microfibrils of a rigid polymer by replacing the solvent of a solution of a rigid polymer with a coagulant which induces microfibrillar formation and interpenetrating the microfibrils by diffusion with a matrix material which replaces the coagulant to form a composite which includes two continuous and interpenetrating phases, a matrix-material phase and a microfibriallar-reinforcing-network phase wherein the matrix-material phase is bonded to the microfibrillar-reinforcing-network phase and bonds the microfibrils to one another to transmit forces therebetween.

2. A process according to claim 1 in which the matrix material is a material that transmits with high mechanical integrity at least one of high shear forces, high compression forces and high tension forces between the microfibrils of the microfibrillar network.

3. A process according to claim 2 wherein the matrix material in the ultimate composite is a solid, in which the network is an oriented network and in which adhesion between fibrils of the microfibrillar network is about as strong as cohesion within the microfibrils.

4. A process according to claim 2 in which the matrix material is taken from the group consisting of cross-linkable polymers, monomers that polymerize to linear polymers, and monomers that polymerize to cross-linked networks.

5. A process according to claim 2 in which the matrix material is an inorganic compound.

6. A process according to claim 5 in which the network of microfibrils is first introduced to a coagulant, then the coagulant is replaced by diffusion by the matrix material which is an inorganic compound that is soluble in the coagulant.

7. A process according to claim 6 in which the inorganic compound is a coagulant-soluble glass.

8. A process according to claim 5 in which the inorganic compound is sodium silicate.

9. A process according to claim 1 in which the matrix phase is an epoxy resin.

10. A process according to claim 1 in which the matrix phase is sodium silicate.

11. A process according to claim 1 in which the matrix phase is initially a solution of nylon monomer precursors, said process further including heating the components to the melting point of the nylon monomer precursors to polymerize the said monomer.

12. A process according to claim 1 in which the microfibrillar network is formed by dry-jet/wet-spinning of anisotropic solutions of poly (p-phenylene benzobisthiazole) (PBT) that forms microfibrils that are oriented along the long axis of a fiber or film that includes the microfibrils and a coagulant, in which the coagulant is replaced by a matrix material taken from the group consisting of linear organic polymers and oligomers, monomers that polymerize to cross-linked polymer networks, and soluble inorganics by a diffusion controlled exchange, and in which the matrix material is then solidified.

13. A process for fabricating a composite, that comprises:
forming a continuous-microfibrillar network by exchanging the solvent of a solution of a rigid polymer with a coagulant which induces microfibrillar formation;
replacing the coagulant by diffusion with a solution of the coagulant and a material taken from the group consisting of coagulant-soluble inorganic glasses; and
removing the coagulant through drying to form a solid continuous inorganic glass phase that interpenetrates the reinforcing-continuous-microfibrillar network.

14. A process for fabricating a composite, that comprises:
forming a continuous-microfibrillar network by exchanging the solvent of a solution of a rigid polymer with a coagulant which induces microfibrillar formation;
exchanging by diffusion the coagulant with solutions of a matrix material or its precursors until the matrix material or its precursors replaces the coagulant by diffusion and infiltrates into the microfibrillar network; and
solidifying the matrix material or its precursors which interpenetrates the continuous-microfibrillar network and forms a second continuous phase, said matrix-material phase being one that transmits high mechanical integrity forces between and among the microfibrils of the microfibrillar network.

15. A process for fabricating a composite, that comprises:
forming a continuous-microfibrillar network by exchanging the solvent of a solution of a rigid polymer with a coagulant which induces microfibrillar formation;
replacing the coagulant by diffusion with a solvent in which a matrix material or its precursors is miscible;
exchanging the solvent by diffusion with solutions of at least one of the matrix material or/its precursors; and
solidifying the matrix material or its precursors which interpenetrates the continuous-microfibrillar network and forms a second continuous phase, said matrix-material phase being one that transmits high mechanical integrity forces between and among the microfibrils of the microfibrillar network.

16. A process for fabricating a composite, that comprises:
forming a continuous-microfibrillar network by replacing by diffusion the solvent of a solution, having both rigid polymers and matrix-forming materials in a common solvent, with a coagulant which induces microfibrillar formation by the rigid polymer; and removing the coagulant by drying to form a solid, retaining interpenetrating rigid microfibrillar and matrix phases, the matrix-material phase being one that transmits high mechanical integrity forces between and among the microfibrils of the microfibrillar network.

17. A process for fabricating a composite, that comprises:
forming a continuous-microfibrillar network by replacing by diffusion the solvent of a solution of a rigid polymer with a coagulant which is a matrix-forming material and which induces microfibrillar formation by the rigid polymer; and
solidifying the matrix-forming material which interpenetrates the continuous-microfibrillar network and forms a second continuous matrix-material phase, said matrix-material phase being one that transmits high mechanical integrity forces between and among the microfibrils of the microfibrillar network.

18. A process according to claim 1 in which the matrix material is a material that transmits forces between the microfibrils of the microfibrillar network about as strong as cohesion between said microfibrils and in which said fabricating is fashioned to achieve the transmission of said forces.

19. A process according to claim 18 in which the matrix material is one wherein the forces transmitted by the matrix material between the microfibrils is at least one of shear forces, compression forces, and tension forces.

* * * * *